United States Patent
Roennow et al.

(10) Patent No.: US 11,397,708 B2
(45) Date of Patent: Jul. 26, 2022

(54) VOTING-CONSENSUS DISTRIBUTED LEDGER

(71) Applicant: Nokia Technologies Oy, Espoo (FI)

(72) Inventors: Troels Roennow, Cambridge (GB); Khan Baykaner, Upper Cambourne (GB)

(73) Assignee: Nokia Technologies Oy, Espoo (FI)

( * ) Notice: Subject to any disclaimer, the term of this patent is extended or adjusted under 35 U.S.C. 154(b) by 294 days.

(21) Appl. No.: 16/486,277

(22) PCT Filed: Feb. 17, 2017

(86) PCT No.: PCT/EP2017/053686
§ 371 (c)(1),
(2) Date: Aug. 15, 2019

(87) PCT Pub. No.: WO2018/149505
PCT Pub. Date: Aug. 23, 2018

(65) Prior Publication Data
US 2019/0384748 A1    Dec. 19, 2019

(51) Int. Cl.
*G06F 21/62* (2013.01)
*G06F 16/182* (2019.01)
*H04L 9/06* (2006.01)
*H04L 9/32* (2006.01)

(52) U.S. Cl.
CPC ...... *G06F 16/1837* (2019.01); *G06F 21/6227* (2013.01); *H04L 9/0637* (2013.01); *H04L 9/3239* (2013.01); *H04L 2209/38* (2013.01); *H04L 2209/463* (2013.01)

(58) Field of Classification Search
CPC ............ G06F 16/1837; G06F 21/6227; H04L 9/0637; H04L 9/3239; H04L 2209/38; H04L 2209/463
See application file for complete search history.

(56) References Cited

U.S. PATENT DOCUMENTS

| | | | |
|---|---|---|---|
| 9,646,029 B1* | 5/2017 | Baird, III | G06F 16/2365 |
| 2007/0208809 A1* | 9/2007 | Westman | H04W 4/06 |
| | | | 709/205 |
| 2014/0067980 A1 | 3/2014 | La Rotonda et al. | |
| 2017/0308548 A1* | 10/2017 | Baird, III | G06F 16/273 |
| 2018/0225661 A1* | 8/2018 | Russinovich | H04L 9/0637 |

FOREIGN PATENT DOCUMENTS

| | | |
|---|---|---|
| AU | 2016101976 A4 | 12/2016 |
| WO | 2005/104594 A1 | 11/2005 |
| WO | 2006/047879 A1 | 5/2006 |

(Continued)

OTHER PUBLICATIONS

Leemon Baird Hashgraph Consensus:Fair, Fast, Byzantine Fault Tolerance Swirlds Tech Report TR-2016-01 May 31, 2016 (Year: 2016).*

(Continued)

*Primary Examiner* — David J Pearson
(74) *Attorney, Agent, or Firm* — Harrington & Smith

(57) ABSTRACT

A technique, comprising: identifying, at an existing node of a distributed ledger network for operation according to a voting-based consensus algorithm, a new candidate node for the distributed ledger network, wherein said identifying is done based on an existing unique identifier unrelated to the distributed ledger network.

17 Claims, 5 Drawing Sheets

(56) References Cited

FOREIGN PATENT DOCUMENTS

| WO | 2008/065349 A1 | 6/2008 |
| WO | 2008/119612 A1 | 10/2008 |
| WO | 2016/015041 A1 | 1/2016 |
| WO | 2016/090095 A1 | 6/2016 |
| WO | 2018/149504 A1 | 8/2018 |

OTHER PUBLICATIONS

Office action received for corresponding European Patent Application No. 17706218.9 , dated Dec. 23, 2020, 5 pages.
"How Might We Use Blockchains Outside Cryptocurrencies?", Jeni's Musings, Retrieved on Jul. 12, 2019, Webpage available at: https://www.jenitennison.com/2015/05/21/blockchain.html.
International Search Report and Written Opinion received for corresponding Patent Cooperation Treaty Application No. PCT/EP2017/053686, dated Mar. 28, 2017, 15 pages.
"Hyperledger Whitepaper", Blockchainlab, Retrieved on Jul. 8, 2019, Webpage available at : http://blockchainlab.com/pdf/Hyperledger%20Whitepaper.pdf.
Vukolić, "The Quest for Scalable Blockchain Fabric: Proof-of-Work vs. BFT Replication", International Workshop on Open Problems in Network Security, 2016, pp. 112-125.
Greenspan, "MultiChain Private Blockchain—White Paper", MultiChain, 2016, pp. 1-17.
Swanson, "Consensus-as-a-Service: A Brief Report on the Emergence of Permissioned, Distributed Ledger Systems", Ofnumbers, Apr. 6, 2015, pp. 1-66.

* cited by examiner

VOTING-CONSENSUS DISTRIBUTED LEDGER

RELATED APPLICATION

This application was originally filed as Patent Cooperation Treaty Application No. PCT/EP2017/053686 filed Feb. 17, 2017.

A replicated distributed ledger is a ledger that is maintained at multiple sites (nodes), with all nodes operating according to a common consensus algorithm about what changes to make to their respective local record of the ledger.

According to one kind of consensus algorithm known as proof-of-work, each node makes a change to its local record of the ledger when a request to make a change is accompanied by a solution to a mathematical puzzle connected with the requested change. According to another kind of consensus algorithm known as proof-of-stake, each change to the ledger is controlled by a randomly selected one of the group of nodes operating the mutual distributed ledger. Both these consensus algorithms have their drawbacks. The proof-of-work algorithm involves wasting a significant amount of computing power at one or more nodes, as they compete to control a change to the distributed ledger. On the other hand, the proof-of-stake algorithm is susceptible to being dominated by an entity with the resources to control a large portion of the nodes operating the distributed ledger.

Another consensus algorithm involves each node making a change to the ledger when it identifies the change as being supported by a majority of the nodes operating the distributed ledger. There has been identified the problem that a distributed ledger operating according to this kind of consensus algorithm is also susceptible to being dominated by an entity with the resources to generate and control a large number of nodes operating the distributed ledger.

The inventors for the present invention have identified the challenge of providing a new distributed ledger technique, which eliminates or reduces these weaknesses.

There is hereby provided a method, comprising: identifying, at an existing node of a distributed ledger network for operation according to a voting-based consensus algorithm, a new candidate node for the distributed ledger network, wherein said identifying is done based on an existing unique identifier unrelated to the distributed ledger network.

According to one embodiment, the method further comprises: using said unique existing identifier to communicate an invitation to join the distributed ledger network.

According to one embodiment, said existing unique identifier comprises an identifier selected from the group consisting of: an email address, a postal address, a mobile number, a fixed line telephone number, and an official local or national government registration number.

There is hereby also provided a method, comprising: checking, at a new node having joined a distributed ledger network operating according to a voting-based consensus algorithm based on an invitation by an existing node of the distributed ledger network, whether one or more predetermined conditions are met for the new node to invite another node into the distributed ledger network.

According to one embodiment, said checking comprises: checking whether the number of invitations made by a preceding generation of nodes including the existing node that invited the new node to join the network, exceeds a predetermined percentage of the maximum number of invitations available to all nodes in said preceding generation.

According to one embodiment, said checking comprises: checking whether a number of invitations already made by the new node equals a maximum number of invitations available to the new node.

According to one embodiment, operation of the distributed ledger involves each node of the network locally recording a change to the ledger at least partly in response to a determination that a predetermined threshold number of voting nodes have voted to accept said change to the ledger.

According to one embodiment, said voting nodes are nodes for which there is a substantially immutable record of registration as a voting node based directly or indirectly on an invitation by a trusted node.

According to one embodiment, said voting nodes are nodes for which one or more blocks of a blockchain record registration as a voting node based on an invitation by a trusted node.

According to one embodiment, said voting nodes are nodes for which one or more blocks of said blockchain record passing of a test to join said group of nodes after an invitation by a trusted node.

According to one embodiment, said test for a candidate node comprises: recordal in one or more blocks of the blockchain of a network identifier for the candidate node; recordal in one or more later blocks of the blockchain of private questions by existing nodes of the distributed ledger network, wherein each private question can only be successfully answered with knowledge of a private number communicated to the candidate node; recordal in one or more later blocks of the blockchain of private answers to the private questions by the candidate node; and recordal in one or more later blocks of the block chain of said private number, and information by which any existing node of the distributed ledger network can decrypt the private questions by other existing nodes and the private answers thereto, and thereby verify that the private answers to the private questions were correct.

According to one embodiment, a trusted node comprises a genesis node or a node for which said blockchain records a chain of one or more invitations extending back to a genesis node.

According to one embodiment, said voting nodes are nodes for which one or more blocks of a blockchain record registration as a voting node based on an invitation by a trusted node and in accordance with one or more invitation rules.

According to one embodiment, said one or more invitation rules comprise restrictions on the number of invitations that a newly registered node is permitted, and/or the timing of one or more invitations by a newly registered node.

There is also hereby provided an apparatus comprising: a processor and memory including computer program code, wherein the memory and computer program code are configured to, with the processor, cause the apparatus to: identify, at an existing node of a distributed ledger network for operation according to a voting-based consensus algorithm, a new candidate node for the distributed ledger network, based on an existing unique identifier unrelated to the distributed ledger network.

According to one embodiment, the memory and computer program code are further configured to, with the processor, cause the apparatus to use said unique existing identifier to communicate an invitation to join the distributed ledger network.

According to one embodiment, said existing unique identifier comprises an identifier selected from the group consisting of: an email address, a postal address, a mobile number, a fixed line telephone number, and an official local or national government registration number.

There is also hereby provided apparatus comprising: a processor and memory including computer program code, wherein the memory and computer program code are configured to, with the processor, cause the apparatus to: check, at a new node having joined a distributed ledger network operating according to a voting-based consensus algorithm based on an invitation by an existing node of the distributed ledger network, whether one or more predetermined conditions are met for the new node to invite another node into the distributed ledger network.

According to one embodiment, the memory and computer program code are further configured to, with the processor, cause the apparatus to: check whether the number of invitations made by a preceding generation of nodes including the existing node that invited the new node to join the network, exceeds a predetermined percentage of the maximum number of invitations available to all nodes in said preceding generation.

According to one embodiment, the memory and computer program code are further configured to, with the processor, cause the apparatus to: check whether a number of invitations already made by the new node equals a maximum number of invitations available to the new node.

According to one embodiment, operation of the distributed ledger involves each node of the network locally recording a change to the ledger at least partly in response to a determination that a predetermined threshold number of voting nodes have voted to accept said change to the ledger.

According to one embodiment, said voting nodes are nodes for which there is a substantially immutable record of registration as a voting node based directly or indirectly on an invitation by a trusted node.

According to one embodiment, said voting nodes are nodes for which one or more blocks of a blockchain record registration as a voting node based on an invitation by a trusted node.

According to one embodiment, said voting nodes are nodes for which one or more blocks of said blockchain record passing of a test to join said group of nodes after an invitation by a trusted node.

According to one embodiment, said test for a candidate node comprises: recordal in one or more blocks of the blockchain of a network identifier for the candidate node; recordal in one or more later blocks of the blockchain of private questions by existing nodes of the distributed ledger network, wherein each private question can only be successfully answered with knowledge of a private number communicated to the candidate node; recordal in one or more later blocks of the blockchain of private answers to the private questions by the candidate node; and recordal in one or more later blocks of the block chain of said private number, and information by which any existing node of the distributed ledger network can decrypt the private questions by other existing nodes and the private answers thereto, and thereby verify that the private answers to the private questions were correct.

According to one embodiment, a trusted node comprises a genesis node or a node for which said blockchain records a chain of one or more invitations extending back to a genesis node.

According to one embodiment, said voting nodes are nodes for which one or more blocks of a blockchain record registration as a voting node based on an invitation by a trusted node and in accordance with one or more invitation rules.

According to one embodiment, said one or more invitation rules comprise restrictions on the number of invitations that a newly registered node is permitted, and/or the timing of one or more invitations by a newly registered node.

There is also hereby provided an apparatus, comprising: means for identifying, at an existing node of a distributed ledger network for operation according to a voting-based consensus algorithm, a new candidate node for the distributed ledger network, wherein said identifying is done based on an existing unique identifier unrelated to the distributed ledger network.

There is also hereby provided an apparatus, comprising: means for checking, at a new node having joined a distributed ledger network operating according to a voting-based consensus algorithm based on an invitation by an existing node of the distributed ledger network, whether one or more predetermined conditions are met for the new node to invite another node into the distributed ledger network.

There is also hereby provided a computer program product comprising program code means which when loaded into a computer controls the computer to: identify, at an existing node of a distributed ledger network for operation according to a voting-based consensus algorithm, a new candidate node for the distributed ledger network, wherein said identifying is done based on an existing unique identifier unrelated to the distributed ledger network.

There is also hereby provided a computer program product comprising program code means which when loaded into a computer controls the computer to: check, at a new node having joined a distributed ledger network operating according to a voting-based consensus algorithm based on an invitation by an existing node of the distributed ledger network, whether one or more predetermined conditions are met for the new node to invite another node into the distributed ledger network.

Embodiment of the invention are described in detail hereunder, by way of example only, with reference to the accompanying drawings, in which:

FIG. 1 illustrates a group of interconnected nodes 2 operating a mutual distributed ledger. As described below, all the nodes 2 have joined the group based on a direct invitation by a genesis node (or one of a plurality of genesis nodes) or by a node which has joined the group based on a chain of invitations extending back to a genesis node (or one of a plurality of genesis nodes).

Figure 1:
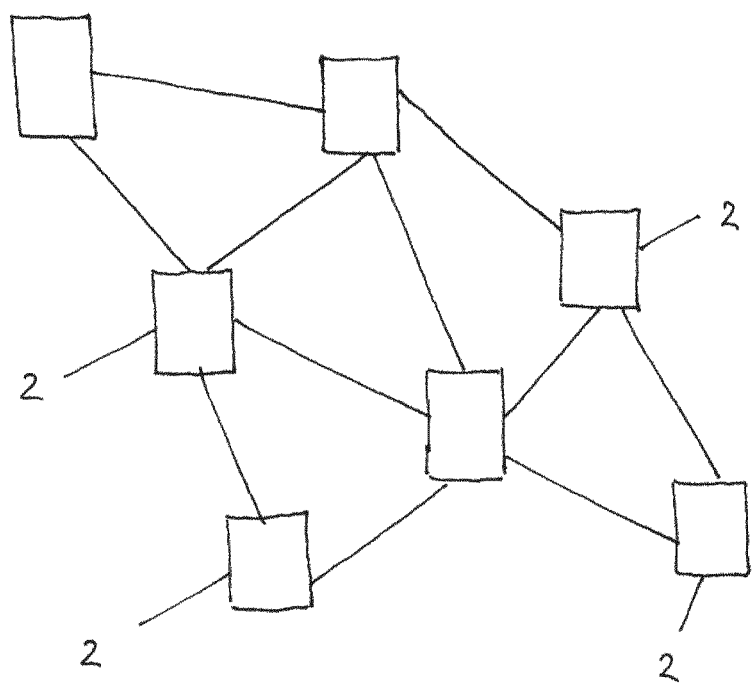
FIG. 1 illustrates a group of nodes operating a mutual distributed ledger.
Figure 2:
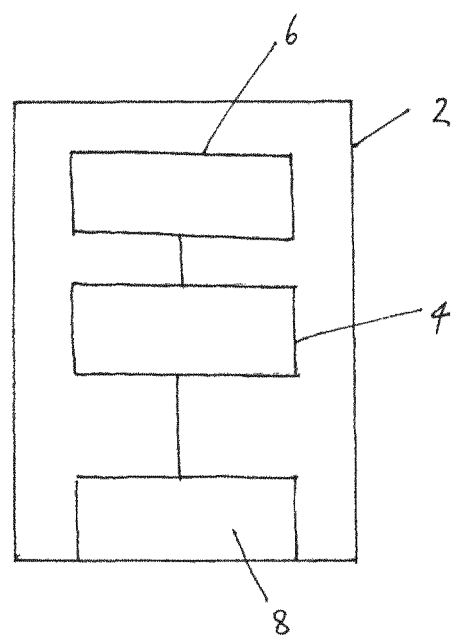
FIG. 2 illustrates an example of apparatus for use at each node of FIG. 1.

FIG. 2 shows an example of apparatus for use at each node 2 of FIG. 1. A processor 4 operates in accordance with program code stored at memory 6. Both the processor 4 and the memory 6 may be implemented as one or more chips. The memory 6 may include read-only memory, volatile memory, non-volatile memory and random-access memory. The above elements may be provided on one or more circuit boards. The apparatus also comprises an interface 8 for transferring data to and from one or more other nodes 2 of the distributed ledger network.

It should be appreciated that the apparatus shown in FIG. 2 described above may comprise further elements which are not directly involved with the embodiments of the invention described hereafter.

All operations described below that are carried out by the processor 4 follow program code stored at memory 6. In one embodiment, all operations carried out by the processor 4 follow code of one or more smart contracts recorded in one or more blocks of a distributed block chain, of which a copy is stored locally at memory 6.

According to one embodiment of the present invention, the building of the group/network of nodes begins with a processor 4 at one or more genesis nodes inviting other nodes (1$^{st}$ generation nodes) to join the group, and continues with processors 4 at those 1$^{st}$ generation nodes inviting other nodes (2$^{nd}$ generation nodes) in addition to the genesis nodes inviting further 1$^{st}$ generation nodes, and so on. The building of the network is recorded in a blockchain (which is referred to, below as a "membership blockchain", but which may be used to also record data other than information about the history of the building of the group), wherein each change (addition of nodes etc.) in the composition of the group is recorded in a block that is linked to the preceding block in the chain, such that an attempt to later tamper with the record in one block of the chain would necessitate a change to the next block in the chain, and so on. Accordingly, any attempt to change one block of the chain would necessitate changes to all subsequent blocks in the chain. In one example of blockchain technology, one way functions (e.g. hash functions) are used to create links between blocks that significantly increase the computing time that would be needed to recreate a block having the necessary link to the earlier block.

Figure 3:
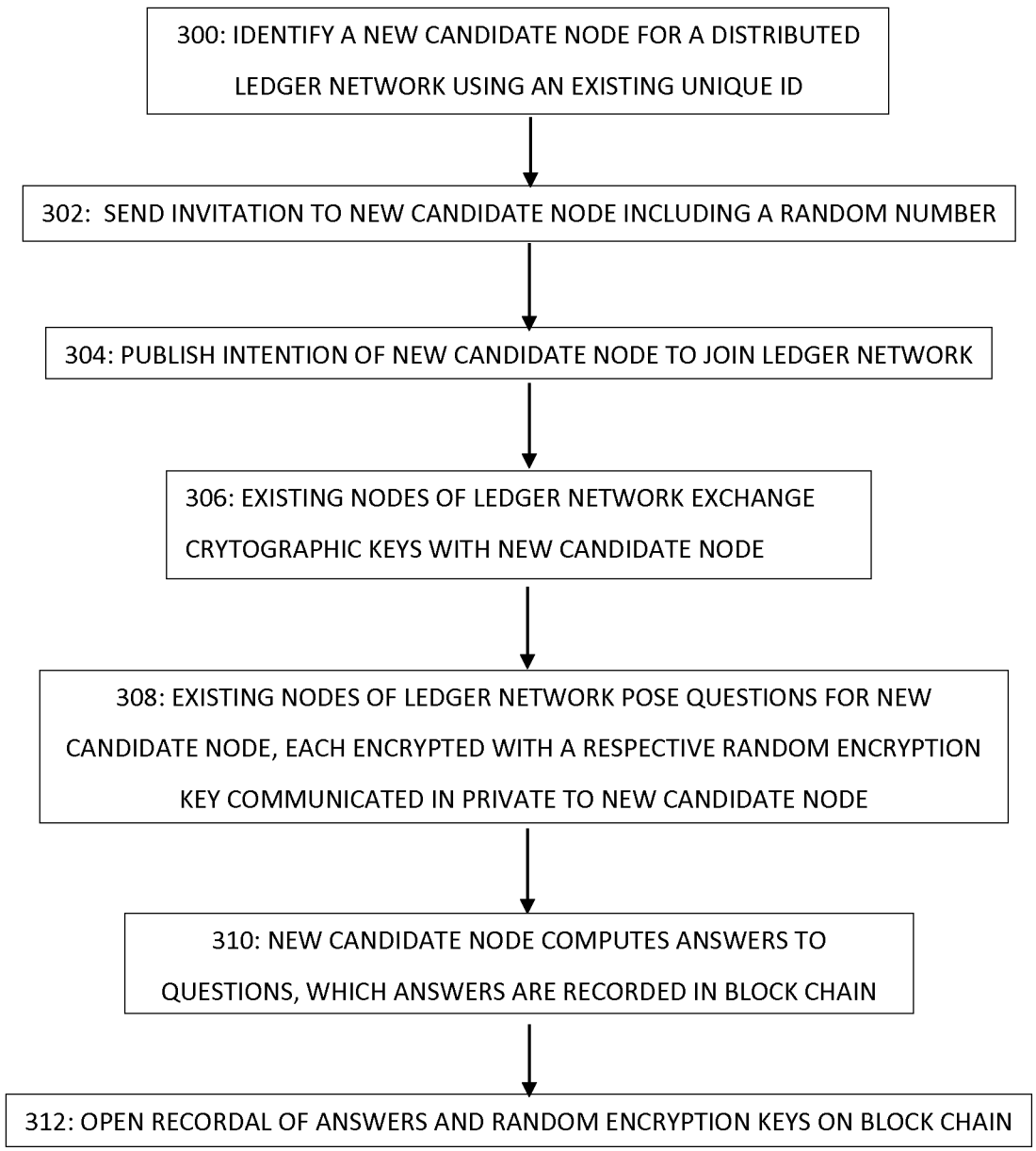
FIG. 3 illustrates an example of a set of operations at nodes of a distributed ledger network for introducing new nodes into the distributed ledger network according to an embodiment of the present invention.

In one embodiment, the invitation process involves a processor 4 at the inviting node (genesis node or e.g. other node already part of the group based on an invitation by the genesis node) identifying a new candidate node for the network by means of an existing unique ID such as e.g. an existing email address (STEP 300 of FIG. 3), and generating for the new candidate node a ledger network ID with an effectively non-reversible unique link to the existing ID, such as the result of applying a one-way function (such as a hash function) to a concatenation of the existing unique ID and a random number (e.g. a 8 or more digits randomly selected from the set of 64-base digits, including 26 lower case Roman alphabet characters, 26 upper case Roman alphabet characters, digits 0 to 9, and two more further characters such as "+" and "/") generated at the inviting node.

For the example that the existing unique ID (from which the new network ID is derived, as described above) comprises an email address, the processor 4 at the inviting node generates and sends an invitation email to the email address including the random number used to generate the network ID (STEP 302).

The new network ID derived from the email address to which the random number was sent may also be recorded in a new block of the block chain. As mentioned above, the new network ID is generated from the existing unique ID in such a way that the existing unique. ID cannot be computed back from the new network ID, even with knowledge of the random number, which as mentioned below ends up being openly recorded on the blockchain.

A processor 4 at the invited node may then respond to the email invitation by publishing (e.g. by recordal in a new block of the block chain, or otherwise) an intention to join the ledger network identifying the network-id mentioned above (STEP 304).

Processors 4 at all other nodes already forming part of the network (referred to hereafter as challenging nodes) then exchange a respective set of cryptographic keys with the invited node (STEP 306). This can be done in private over any open communication network using a shared secret technique such as e.g. using the Diffie-Helman algorithm. This exchange may begin with the invited node identifying a public key of a private key-public key pair when publishing its intent to join the ledger network. As described below, the shared secret shared between the invited node and an existing, "challenging" node of the network is used both (i) for the private communication of questions and answers between the nodes as part of the process of bringing the new node into the network, and (ii) for the voting process used to establish a consensus about making changes to the distributed ledger operated by the ledger network.

A processor 4 at each existing, challenging node also computes a random encryption key (separate to the shared secret for private communication between the respective challenging node and the invited node), and generates a question which can only be successfully answered with knowledge of the random number mentioned above, such as: what is the nth digit of the random number? what is the sum of the random number and another, specified number? what is the random number modulo 132? or any other question for which the right answer can be trivially computed with knowledge of the random number. The processor 4 at the challenging node encrypts the question using the random encryption key, and generates an encrypted version of the random encryption key using the shared secret. The processor 4 at the challenging node generates a message for the invited node including the encrypted question, and the encrypted version of the random encryption key (STEP 308). The message may also be recorded in a new block of the blockchain. All existing "challenging" nodes of the network operate as set out above, so that the invited node receives as many questions (each encrypted with a respective random encryption key) as there are existing nodes.

For each message from each existing, challenging node, the processor 4 at the invited node decrypts the encrypted version of the respective random encryption key using the respective shared secret; and then decrypts the respective question using the respective decrypted random encryption key. For each question, the processor 4 at the invited node computes the answer to the question using its knowledge of the random number, and encrypts the answer using the respective random encryption key provided by the respective challenging node. The encrypted answers are recorded in their encrypted form in one or more new blocks of the blockchain (STEP 310).

Subsequently, the small random number is recorded openly in a new block of the blockchain, and all the random encryption keys (used by the challenging nodes to encrypt the respective question for the invited node and the answer thereto) are also openly recorded in one or more new blocks of the blockchain (STEP 312), by which any node can decrypt all questions posed to the invited node and all answers made by the invited node to those questions, and thereby verify that the invited node provided the correct answers to all questions posed by the existing challenging nodes. The blockchain thus provides an effectively immutable record of the invited node having been invited by a trusted node and having passed the test to join the ledger network. The effectively immutable property of the blockchain prevents any dishonest tampering with the record in any individual block, and thus effectively prevents any node joining the ledger network and being able to vote on changes to the distributed ledger, without a proper invitation and without passing the test.

In one embodiment, a smart contract recorded in one or more blocks of the blockchain permits only a genesis node to invite new nodes to join the network; in another embodiment, a smart contract recorded in one or more blocks of the blockchain permits all nodes forming part of the ledger network to invite new nodes; and in yet another embodiment, a smart contract recorded in one or more blocks of the blockchain permits the one or more genesis nodes to decide for each non-genesis node whether to give that non-genesis node permission to invite new nodes.

As mentioned above, the nodes that have joined the ledger network operate a distributed ledger, which may be the same ledger as the membership blockchain mentioned above for keeping an effectively immutable record of the process by which each node joined the ledger network, or may be a separate, additional ledger. Establishing consensus about making changes to the distributed ledger is achieved by the nodes voting on changes to the network. Authentication at one node of a vote made by another node is done using the respective shared secret shared between the nodes during the joining process, as described above.

Figure 4:
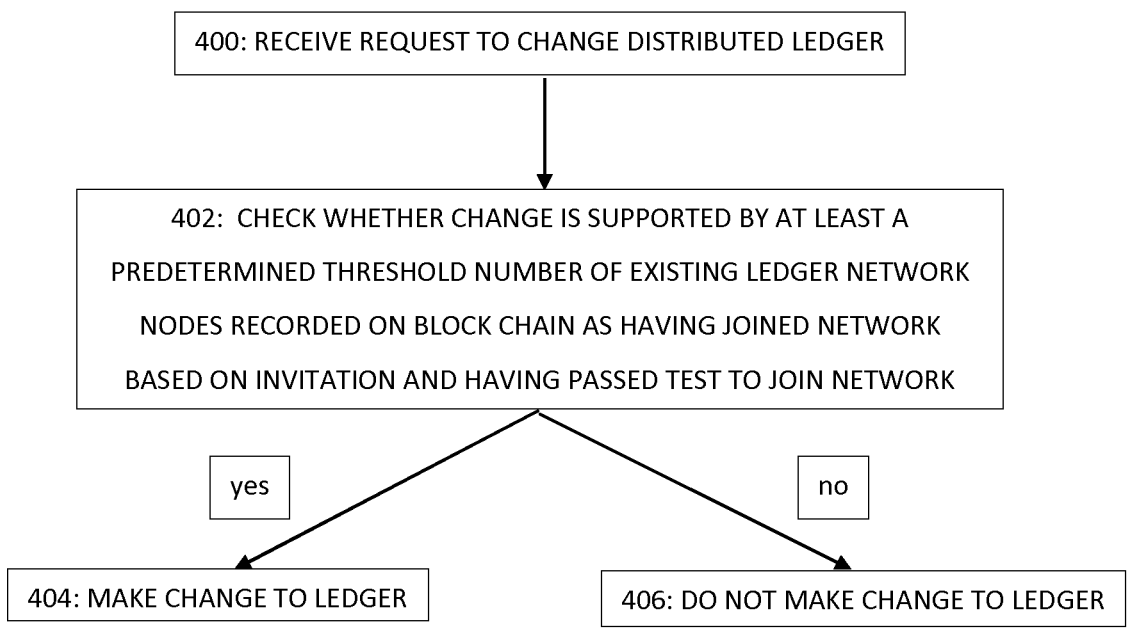
FIG. 4 illustrates an example of a set of operations at a node of a distributed ledger network for making changes to a local record of the distributed ledger, according to an embodiment of the present invention.

FIG. 4 illustrates an example of a set of operations at a processor 4 at a node A forming part of the ledger network, in relation to maintaining a distributed ledger. The processor 4 at node A receives a request to change the ledger (STEP 400). The processor checks whether at least a predetermined threshold number of network nodes are voting for the change (STEP 402). The processor uses the shared secrets shared between node A and all other nodes of the network (either when node A joined the network or the other node joined the ledger network, depending on which happened first) to authenticate the votes made by other nodes. According to one example, the predetermined threshold number may be a majority of the total number of existing nodes of the network. If the result of this check is positive, the processor updates its local copy of the ledger according to the request (STEP 404). On the other hand, if the result of this check is negative, the processor does not change its local copy of the ledger (STEP 406). All other nodes forming part of the ledger network operate in the same way, whereby identical copies of the ledger are maintained at each node forming part of the ledger network.

If at some later stage, a node of the ledger network identifies another node of the network as a suspected corrupted node, the node follows a instruction in a smart contract recorded in one or more blocks of the blockchain to call a vote among remaining nodes about excluding from the ledger network both the suspected corrupted node and any other node already forming part of the network based on an invitation from the corrupted node (either a direct invitation by the corrupted node or an invitation forming part of a chain of invitations extending back to an invitation by the corrupted node). Each remaining node (i.e. all existing nodes of the ledger network except the corrupted node and any other node already forming part of the network based on an invitation from the corrupted node) vote on whether to exclude the corrupt node and related nodes from the network. Authentication of the votes uses the respective shared secrets shared between respective pairs of nodes during the network joining process. If at least a predetermined threshold number of the remaining nodes (e.g. a majority of the total number of remaining nodes) vote for the exclusion, the processor 4 at the node that called for the exclusion begins refreshing the ledger network by initiating a new joining process for all remaining nodes. The new joining process involves the sharing of respective new shared secrets between each pair of the remaining nodes, which effectively excludes any future influence on changes to the distributed ledger by excluded nodes. In one example, a smart contact recorded in one or more blocks of the blockchain may permit any existing node of the network to call a vote for excision of a suspected corrupted node and related nodes from the ledger network. In another example, a smart contract may permit only those nodes that have permission to invite new nodes to join the network to call a vote for excision of a suspected corrupted node and related nodes from the ledger network. According to another example, a smart contract may permit a genesis node to excise a suspected corrupted node and related nodes from the ledger network and initiate the above-mentioned new joining process for remaining nodes, without requiring at least a predetermined majority threshold number (e.g. majority) of remaining nodes to support the excision.

Figure 6:
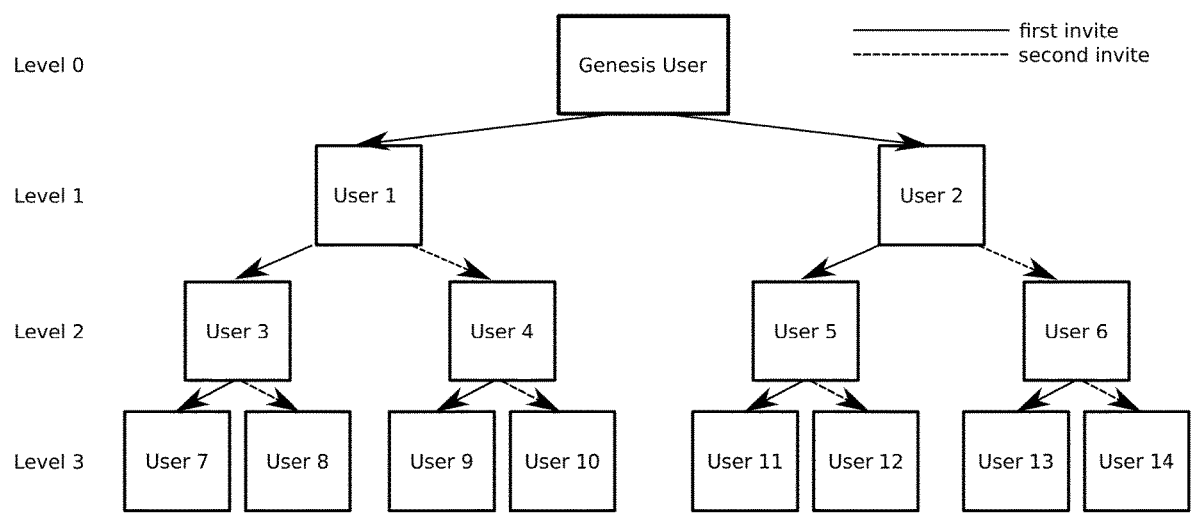
FIG. 6 illustrates one example of a technique for building a group of nodes with rights to vote on changes to a distributed ledger, according to an embodiment of the present invention.

As mentioned above, building/growing the network may involve nodes other than genesis nodes having permission to invite new nodes to join the ledger network. According to one embodiment, one or more blocks of the blockchain record one or more smart contracts specifying rules about when new nodes can invite other nodes to join the network. One example of a set of rules is: (i) any node can itself invite up to 2 new nodes to join the network, but may only use the $2^{nd}$ invitation after using the $1^{st}$ invitation; and (ii) nodes of one generation only have permission to use their invitations after at least a predetermined percentage (e.g. 75%) of all invitations available to the immediately preceding generation of nodes have been used. This example of a set of rules is illustrated in FIG. 6 for a very simple network build. A genesis node (also referred to as a $0^{th}$ generation/level node) invites two new nodes ($1^{st}$ generation/level nodes), User 1 and User 2, to join the ledger network. After joining the ledger network, these two $1^{st}$ generation nodes each use one of their two available invitations to bring $2^{nd}$ generation nodes User 3 and User 5 into the ledger network. At this point, only 50% (2 out of 4) of the invitations available to the $1^{st}$ generation nodes (Users 1 and 2) have been used, and new nodes User 3 and User 5 do not yet have permission to invite new nodes into the ledger network. Only after $1^{st}$ generation nodes User 1 and/or User 2 use their second invitation (to bring User 4 and/or User 6 into the ledger network), does any $2^{nd}$ generation node (any of Users 3 to 6) have permission to invite any new node into the ledger network. Similarly, only after the $2^{nd}$ generation nodes (Users 3 to 6) have used at least 75% of the total invitations available to the $2^{nd}$ generation nodes, can any of the $3^{rd}$ generation nodes (Users 7 to 14 in FIG. 4) start to invite new nodes into the ledger network. This method guarantees that a new node to the ledger network cannot flood the ledger network with new nodes selected directly or indirectly by it, thereby better preventing any single entity from controlling a majority of nodes by which it can control changes to the distributed ledger. In this example, the number of invitations available to any new node and the trigger condition for next generation nodes to start making $2^{nd}$ invitations (e.g. threshold percentage of e.g. 75%) is the same for each generation, but according to one variation, either or both of these are set differently for different generations.

Figure 5:
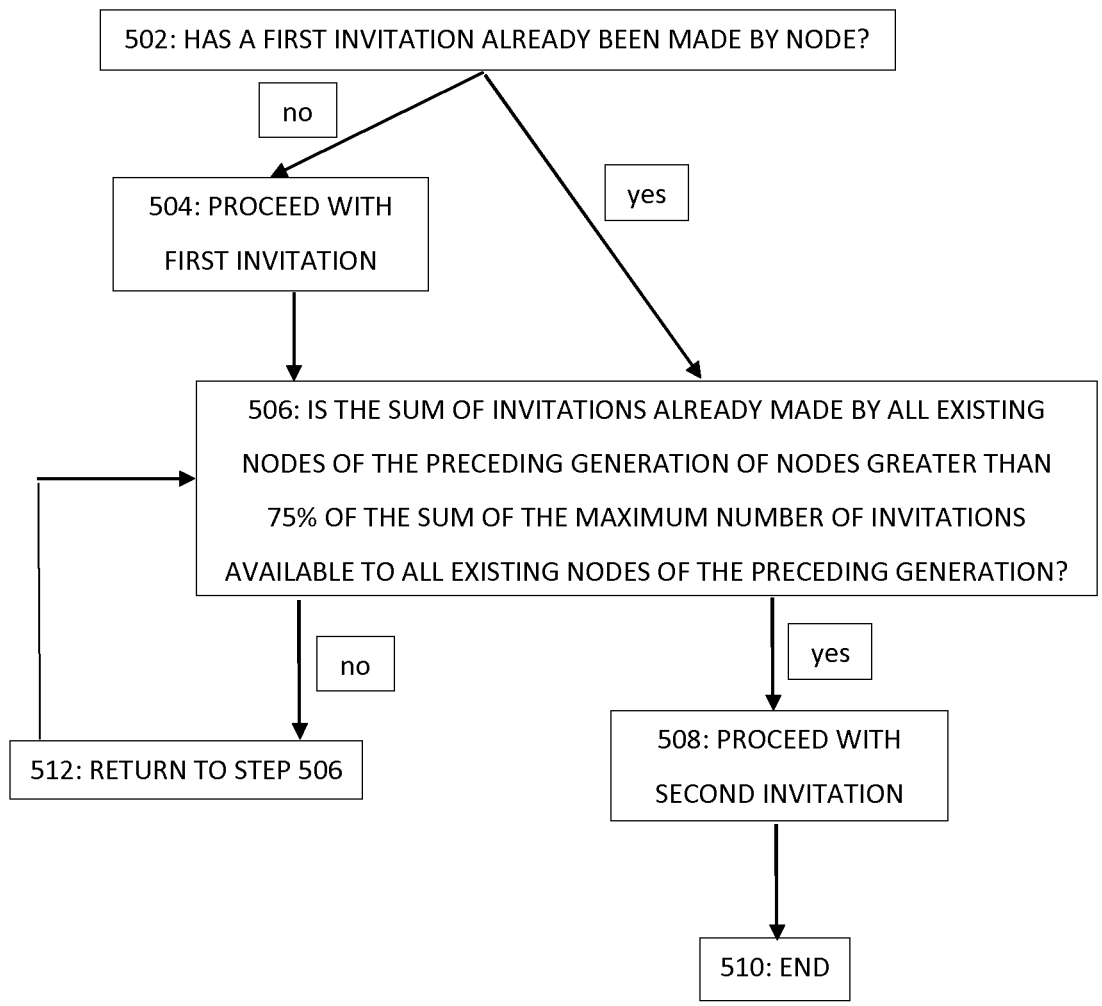
FIG. 5 illustrates an example of a set of operations at a node of a distributed ledger network for growing the distributed ledger network, according to an embodiment of the present invention.

FIG. 5 illustrates an example of a set of operations at a processor of a node, operating in accordance with the example rules described above. The processor 4 determines whether the node has already made a first invitation (STEP 500). If NO, the processor 4 proceeds with a first invitation (STEP 504). If YES, the processor 4, checks whether the sum of all invitations made by all existing nodes in the preceding generation of nodes is greater than e.g. 75% of the sum of the maximum number of invitations available to all existing nodes in the preceding generation (STEP 506). If YES, the processor proceeds with a second invitation (STEP 508), bringing an end (STEP 510) to the invitation process for the node, for this specific example of the node only being allowed a maximum of two invitations. If NO, the processor returns to STEP 506 (STEP 512).

An embodiment of the present invention has been described for the example of using email addresses as existing unique IDs on which to base ledger network IDs. However, other existing unique IDs can be used, such as postal addresses, and mobile and other telephone numbers, for which ordinary letters, text messages (short message service (SMS) messages) or telephone calls can be used to communicate the above-mentioned random number to a candidate new node of the ledger network. MAC or IP addresses may also be utilised as unique IDS; and similarly existing unique ids not associated with communication systems could be used, such as national insurance numbers. The use of such existing unique public ids may involve a central party managing and scrambling the public ids.

Building the distributed ledger network based on invitations to new nodes identified by means of an existing unique identifier unrelated to the distributed ledger network makes it more difficult for any single controlling entity to populate the distributed ledger network with nodes under its control, and thereby makes it more difficult for any single entity to control changes to the distributed ledger.

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method, comprising:
checking, at a new node having joined a distributed ledger network operating according to a voting-based consensus algorithm based on an invitation by an existing node of the distributed ledger network, whether a number of invitations made by a preceding generation of nodes, including the existing node that invited the new node to join the network, exceeds a predetermined percentage of a maximum number of invitations available to all nodes in said preceding generation; and
inviting, by the new node, another node into the distributed ledger network in response to the number of invitations exceeding the predetermined percentage of the maximum number of invitations.

2. A method according to claim 1, wherein said checking comprises: checking whether a number of invitations already made by the new node is less than a maximum number of invitations available to the new node, and performing the inviting in response to the number of invitations already made by the new node being less than the maximum number of invitations available to the new node.

3. A method according to claim 1, wherein operation of the distributed ledger involves each node of the network locally recording a change to the ledger at least partly in response to a determination that a predetermined threshold number of voting nodes have voted to accept said change to the ledger.

4. A method according to claim 3, wherein said voting nodes are nodes for which there is an immutable record of registration as a voting node based directly or indirectly on an invitation by a trusted node.

5. A method according to claim 4, wherein said voting nodes are nodes for which one or more blocks of a blockchain record registration as a voting node based on an invitation by a trusted node.

6. A computer program product according to claim 1, wherein operation of the distributed ledger involves each node of the network locally recording a change to the ledger at least partly in response to a determination that a predetermined threshold number of voting nodes have voted to accept said change to the ledger.

7. An apparatus comprising:
a processor and
memory including computer program code, wherein the memory and computer program code are configured to, with the processor, cause the apparatus to:
check, at a new node having joined a distributed ledger network operating according to a voting-based consensus algorithm based on an invitation by an existing node of the distributed ledger network, whether a number of invitations made by a preceding generation of nodes, including the existing node that invited the new node to join the network, exceeds a predetermined percentage of a maximum number of invitations available to all nodes in said preceding generation; and
inviting, by the new node, another node into the distributed ledger network in response to the number of invitations exceeding the predetermined percentage of the maximum number of invitations.

8. An apparatus according to claim 7, wherein the memory and computer program code are further configured to, with the processor, cause the apparatus to: check whether a number of invitations already made by the new node is less than a maximum number of invitations available to the new node, and performing the inviting in response to the number of invitations already made by the new node being less than the maximum number of invitations available to the new node.

9. An apparatus according to claim 7, wherein operation of the distributed ledger involves each node of the network locally recording a change to the ledger at least partly in response to a determination that a predetermined threshold number of voting nodes have voted to accept said change to the ledger.

10. An apparatus according to claim 9, wherein said voting nodes are nodes for which there is an immutable record of registration as a voting node based directly or indirectly on an invitation by a trusted node.

11. An apparatus according to claim 10, wherein said voting nodes are nodes for which one or more blocks of a blockchain record registration as a voting node based on an invitation by a trusted node.

12. An apparatus according to claim 11, wherein said voting nodes are nodes for which one or more blocks of said blockchain record passing of a test to join said group of nodes after an invitation by a trusted node.

13. An apparatus according to claim 12, wherein said test for a candidate node comprises:
  recordal in one or more blocks of the blockchain of a network identifier for the candidate node;
  recordal in one or more later blocks of the blockchain of private questions by existing nodes of the distributed ledger network, wherein each private question can only be successfully answered with knowledge of a private number communicated to the candidate node;
  recordal in one or more later blocks of the blockchain of private answers to the private questions by the candidate node; and
  recordal in one or more later blocks of the block chain of said private number, and information by which any existing node of the distributed ledger network can decrypt the private questions by other existing nodes and the private answers thereto, and thereby verify that the private answers to the private questions were correct.

14. An apparatus according to claim 11, wherein a trusted node comprises a genesis node or a node for which said blockchain records a chain of one or more invitations extending back to a genesis node.

15. An apparatus according to claim 11, wherein said voting nodes are nodes for which one or more blocks of a blockchain record registration as a voting node based on an invitation by a trusted node and in accordance with one or more invitation rules.

16. An apparatus according to claim 15, wherein said one or more invitation rules comprise restrictions on a number of invitations that a newly registered node is permitted, or restrictions on timing of one or more invitations by a newly registered node or both the restrictions on the number of invitations that a newly registered node is permitted, or restrictions on the timing of one or more invitations by a newly registered node.

17. A computer program product comprising a non-transitory medium bearing computer program code embodied therein for use with a computer, the computer program code comprising:
  checking, at a new node having joined a distributed ledger network operating according to a voting-based consensus algorithm based on an invitation by an existing node of the distributed ledger network, whether a number of invitations made by a preceding generation of nodes, including the existing node that invited the new node to join the network, exceeds a predetermined percentage of a maximum number of invitations available to all nodes in said preceding generation; and
  inviting, by the new node, another node into the distributed ledger network in response to the number of invitations exceeding the predetermined percentage of the maximum number of invitations.

* * * * *